US010662579B2

(12) United States Patent
Sandakelum et al.

(10) Patent No.: US 10,662,579 B2
(45) Date of Patent: May 26, 2020

(54) POLYURETHANE COATED FABRIC

(71) Applicant: MIDAS SAFETY INNOVATIONS LIMITED, St. Helier (JE)

(72) Inventors: Asanka Sandakelum, Theligama (LK); Piyal Ariyananda, Colombo (LK); Gary Waterhouse, Stockport (GB); Sankarapillai Hari, Colombo (LK)

(73) Assignee: Midas Safety Innovations Limited, St. Helier (JE)

( * ) Notice: Subject to any disclaimer, the term of this patent is extended or adjusted under 35 U.S.C. 154(b) by 0 days.

(21) Appl. No.: 15/576,945

(22) PCT Filed: Apr. 26, 2016

(86) PCT No.: PCT/GB2016/051178
§ 371 (c)(1),
(2) Date: Nov. 27, 2017

(87) PCT Pub. No.: WO2016/174418
PCT Pub. Date: Nov. 3, 2016

(65) Prior Publication Data
US 2018/0148892 A1 May 31, 2018

Related U.S. Application Data

(60) Provisional application No. 62/152,985, filed on Apr. 27, 2015.

(51) Int. Cl.
*D06N 3/00* (2006.01)
*D06N 3/14* (2006.01)
(Continued)

(52) U.S. Cl.
CPC ....... *D06N 3/0063* (2013.01); *A41D 19/0065* (2013.01); *A41D 19/04* (2013.01);
(Continued)

(58) Field of Classification Search
CPC .......... C09D 7/61; C09D 7/41; C09D 175/04
See application file for complete search history.

(56) References Cited

U.S. PATENT DOCUMENTS 3,772,059 A 11/1973 Shikada et al.
4,948,692 A 8/1990 Higashimura et al.
(Continued)

FOREIGN PATENT DOCUMENTS

EP 0844286 A1 5/1998
EP 1921937 B1 11/2009

OTHER PUBLICATIONS

International Search Report, International Application No. PCT/GB2016/051178, dated Jul. 14, 2016.

*Primary Examiner* — Dah-Wei D. Yuan
*Assistant Examiner* — Kristen A Dagenais-Englehart
(74) *Attorney, Agent, or Firm* — Marshall & Melhorn, LLC

(57) ABSTRACT

A method for making a polyurethane coated fabric, the method comprising:— a) providing a fabric liner; b) applying a coating to at least part of the liner, said coating comprising a polyurethane resin and manganese ferrite dissolved in a polar aprotic solvent; c) at least partially gelling the coating with water or an aqueous solution, so that the polar aprotic solvent is extracted from the coating; d) leaching the at least partially gelled coating with water or an aqueous solution, so as to further reduce the level of the polar aprotic solvent in the coating; and e) drying and curing the coating. The coating may also contain a dark colour pigment. A composition suitable for use in the method is also provided. The method enables polyurethane coated fabric products, such as gloves, to be produced which are black or grey in colour and contain a reduced amount of residual polar aprotic solvent, such as N,N-dimethylformamide.

6 Claims, 1 Drawing Sheet

(51) Int. Cl.
  *C09D 175/04* (2006.01)
  *A41D 19/04* (2006.01)
  *C09D 7/61* (2018.01)
  *C09D 7/41* (2018.01)
  *A41D 19/00* (2006.01)
  *A41D 19/015* (2006.01)
  *C08K 3/04* (2006.01)
  *C08K 3/22* (2006.01)
  *C08K 5/00* (2006.01)

(52) U.S. Cl.
  CPC .............. *C09D 7/41* (2018.01); *C09D 7/61* (2018.01); *C09D 175/04* (2013.01); *D06N 3/0009* (2013.01); *D06N 3/0065* (2013.01); *D06N 3/0088* (2013.01); *D06N 3/14* (2013.01); *A41D 19/015* (2013.01); *C08K 3/04* (2013.01); *C08K 3/22* (2013.01); *C08K 5/0091* (2013.01); *C08K 2003/2262* (2013.01); *C08K 2003/2265* (2013.01); *D06N 2201/0263* (2013.01); *D06N 2205/246* (2013.01); *D06N 2209/0823* (2013.01); *D06N 2211/103* (2013.01)

(56) References Cited

U.S. PATENT DOCUMENTS

| | | | |
|---|---|---|---|
| 5,436,399 A * | 7/1995 | Koyama | C08G 18/10 428/423.1 |
| 7,122,593 B2 | 10/2006 | Lucas et al. | |
| 7,635,733 B2 | 12/2009 | Lucas et al. | |
| 8,241,705 B2 | 8/2012 | Sha | |
| 8,256,029 B2 | 9/2012 | Fujihana et al. | |
| 8,894,896 B2 | 11/2014 | Taylor et al. | |
| 2004/0154072 A1 | 8/2004 | Connor | |
| 2004/0156986 A1* | 8/2004 | Yadav | B82Y 30/00 427/180 |
| 2008/0044582 A1* | 2/2008 | Kitagawa | D06P 1/5221 427/412 |
| 2010/0050319 A1* | 3/2010 | Fujihana | A41D 19/0065 2/161.1 |
| 2010/0247778 A1* | 9/2010 | Sha | C09D 175/04 427/354 |
| 2014/0335329 A1 | 11/2014 | Abayasinghe et al. | |

* cited by examiner

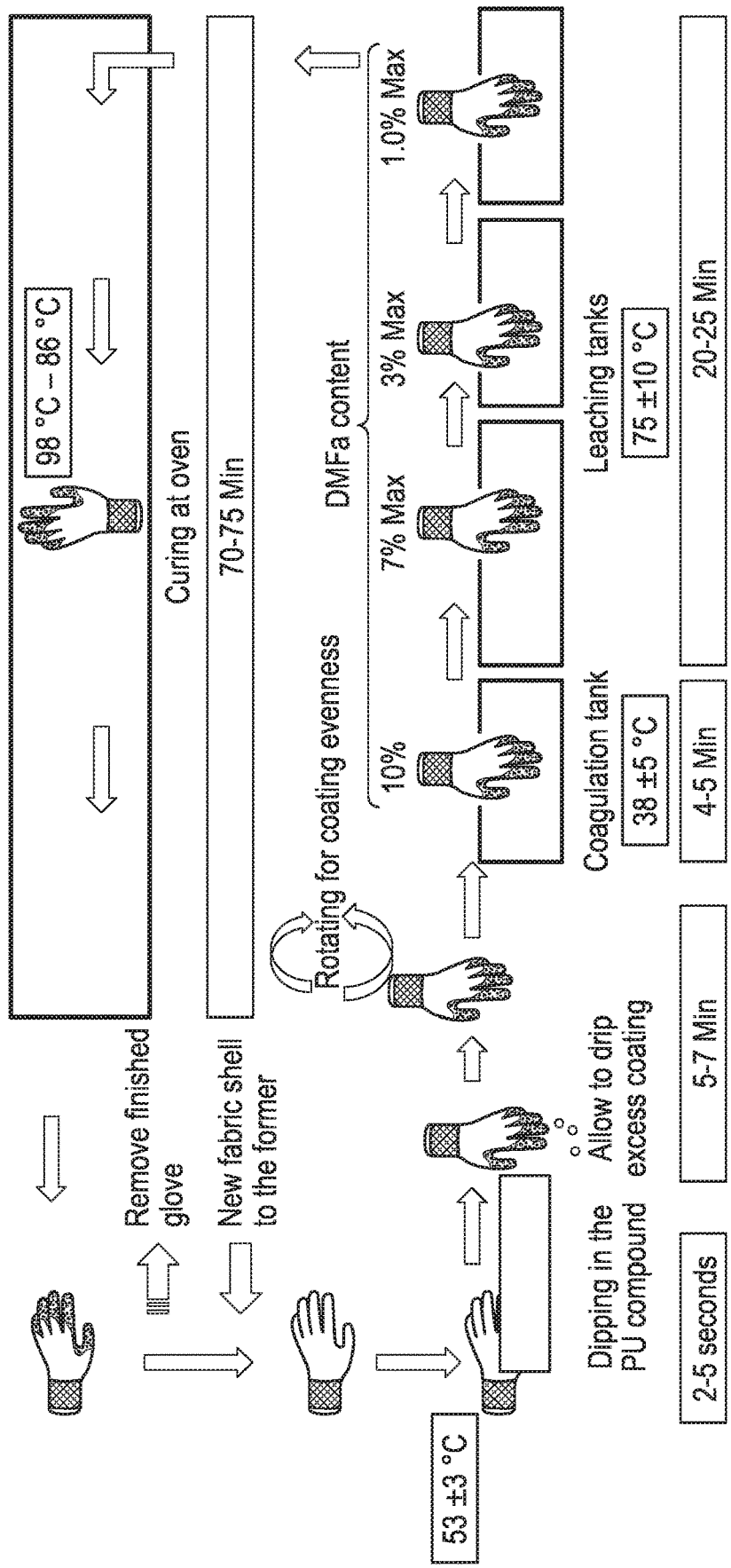

POLYURETHANE COATED FABRIC

FIELD OF THE INVENTION

The present invention relates to the manufacture of polyurethane (PU) coated fabric products, such as gloves. More particularly, it relates to a method and composition for producing such products which are black or grey in colour and contain a reduced amount of residual N,N-dimethylformamide (DMFa).

BACKGROUND TO THE INVENTION

PU coated garments, particularly gloves, are commonly produced by the method of dip coating. This involves the dissolving of PU resins with DMFa, along with other components such as processing aids and colorants, to provide viscous flowing dipping compounds specifically for glove coatings. The coatings in question are often coloured black when the gloves are intended for industrial purposes and the black pigment used is typically carbon black.

It is well known in the glove business that PU gloves contain residual DMFa from the processing of the gloves. There have been many publications on the matter of the use of DMFa in PU glove production. The patents/published applications U.S. Pat. No. 8,894,896, EP 192193761, U.S. Pat. No. 8,241,705 and WO 2008029703 A1 both discuss the processing of PU resin based gloves with polar aprotic solvents, such as DMFa, and describe the dangers of residual DMFa in PU gloves along with trying to provide alternative materials and processes.

It is known that DMFa is a dangerous chemical and exposure to high levels should be avoided. It is a known allergen and can be absorbed through the skin. Excess exposure can cause liver malfunction and other health complications. Hence every effort is made to remove the residual DMFa from the gloves during processing.

Currently, testing for the level of residual DMFa in work gloves is being introduced in the new European Standard EN 420 for safety gloves and where a specified extraction method of EN 16778 is established to determine reasonably accurately the amount of the residual DMFa contaminant.

Surprisingly, what is less known is the fact that there is generally far more residual DMFa left over in black coloured compound dipped gloves as compared to both grey coloured gloves (where a small amount of carbon black is used in combination with a white pigment, usually titanium dioxide, in their colouration) and white gloves. The pigment base being used across the market to make black PU gloves is carbon black. It is the pigment of choice due to both practicality and cost. In fact, carbon black is used to colour most polymer bases for articles.

Most gloves being made for use in industry are black or grey, and they both contain carbon black pigment. The amounts of black pigment used with titanium dioxide to create grey colour are very small, typically from 0.01% to 1 or 2% by weight, depending on the darkness of grey required. Those practised in the art will know of the blends used to create the many shades of grey. These tiny amounts of carbon black still have effects on anchoring and holding residual aprotic solvents in the gloves, as explained below.

The problem is that carbon black has both a unique chemistry and physical nature. The microscopic particles of carbon black are highly structured materials that tend to have huge relative surface areas. The chemical nature of carbon black means that it has a tendency to attract and lock on to organic solvents and organic materials by adsorption, holding on to them within the black coloured polymer matrix. This property of chemical attraction is referred to as the 'active effect' in the following description.

As mentioned above, the pigment used in white coloured gloves is titanium dioxide. Unlike carbon black, titanium dioxide does not offer any significant chemical attraction 'active effect' to DMFa or other organic solvents used during the manufacturing process. Consequently, residual DMFa is significantly less of a problem with white gloves.

Activated charcoal (further modified carbon black) is used in applications where the adsorption and holding of hazardous organic materials and solvents is an essential requirement. Such uses include in respirator cartridges and also nuclear, biological and chemical (NBC) warfare suits—where, for example, mustard gas protection may be required. In the case of respirator cartridges, they are packed with grains of activated charcoal and as one breathes fumes along with air through the cartridges the solvents are 'mopped up' out of the air. Similarly, with NBC suits there is a layer of activated charcoal impregnated foam running in the middle of laminated fabric as a sandwich to adsorb organic vapours and so prevent the transfer of the hazardous organic chemical to the wearer.

In the case of black PU gloves, it is this property of the carbon black that is very undesirable as the carbon holds onto the residual DMFa that one would want to remove during the manufacturing process. The carbon restricts the DMFa from being leached out of the coating during the process. Nor does it fully allow the evaporation of the DMFa from the coating at higher temperatures of glove cure in the final ovens. Such are the problems of black gloves that many manufacturers and sellers introduce additional washing and drying programs to reduce the relatively high DMFa levels.

Another problem with carbon black is residual poly aromatic hydrocarbons (PAH). They are another hazardous listed and restricted chemical group—according to DIN EN 1186ff and s 64 LFGB 80.30 and GS symbol concession according to AfPS GS 2014:01 PAH. Though some carbon black pigments available on the market have been 'double processed/refined' to remove residual PAHs—these pigments are in limited supply and are expensive.

Hence there is a need to reduce or remove carbon black pigments from PU fabric and glove dipping formulations. Surprisingly, this is not so easy. There are alternative black pigments available in the pigment industry. The ones generally being used are metal oxide based, such as iron oxide. However, these pigments are very weak and do not have the strength of shade that carbon black has. The strength and depth of the black is known as the "jetness"; hence the term "jet black". There are also organic black pigments that are both expensive and also not strong enough.

Formulations made with the direct replacement of carbon black by iron oxide give a blue grey coloured dip glove coating—not at all jet black. Even with double the loading of iron oxide, it simply does not have the effective strength of blackness required.

The U.S. Pat. Nos. 7,122,593 and 7,635,733 describe latex gloves which contain dispersed chromium oxide particles and are thereby rendered magnetically detectable. The published patent application US 2004/0154072A1 relates to gloves that contain electromagnetically detectable particles, such as iron oxides or other ferrous materials. All of these gloves are intended to be worn by persons working in areas such as the preparation of food products, so that fragments of the gloves that may become detached or torn off during use can be easily detected and do not contaminate the food products.

SUMMARY OF THE INVENTION

It is the aim of the invention to overcome or at least reduce the health hazard disadvantages of using carbon black pigments in solvent based PU compounds.

According to the present invention there is provided a method for making a polyurethane coated fabric, the method comprising:—
a) providing a fabric liner;
b) applying a coating to at least part of the liner, said coating comprising a polyurethane resin and manganese ferrite dissolved in a polar aprotic solvent;
c) at least partially gelling the coating with water or an aqueous solution, so that the polar aprotic solvent is extracted from the coating;
d) leaching the at least partially gelled coating with water or an aqueous solution, so as to further reduce the level of the polar aprotic solvent in the coating; and
e) drying and curing the coating.

The present invention thus provides a method for manufacturing PU coated fabric that includes the use of a solution/dispersion comprising manganese ferrite. The manganese ferrite is present in an amount of from 5-15%, more preferably from 8-12% and most preferably about 10% by weight of the composition.

The solution/dispersion may also contain a dark colour pigment and/or a reduced amount (compared to conventional methods) of carbon black. It has been found that the use of such a solution/dispersion results in the production of PU coated fabric having an acceptably dark shade of black. A green based dark colour pigment is preferred. Furthermore, a grey PU coated fabric can be produced by adding a white pigment, such as titanium dioxide, to the solution/dispersion. The amount of the white pigment to be added will of course depend upon the shade of grey that is desired. It is well within the ability of those skilled in the art to calculate suitable proportions for the white pigment.

According to another aspect of the present invention there is provided a composition comprising a solution/dispersion of manganese ferrite and a dark colour pigment, most preferably an organic green based pigment. The proportions of the manganese ferrite (powder, dry weight) to the dark green pigment (dry weight) are generally in the range of from 10:0.001 to 10:1.0; more usually from 10:0.01 to 10:0.50; preferably from 10:0.025 to 10:0.25 and more preferably no greater than 10:0.1. A ratio of manganese ferrite:green pigment of from 10:0.025 to 10:0.075 is particularly preferred, with 10:0.05 being most preferred. The proportions of manganese ferrite to other dark colour pigments, if they are used either alternatively or additionally to the dark green pigment, will typically be the same as those quoted above.

According to another aspect of the present invention, there is provided a composition comprising a solution/dispersion of manganese ferrite and carbon black. The carbon black will be in an amount less than that which is used in conventional methods. It will be within the ability of those skilled in the art to calculate suitable proportions for the carbon black component according to the shade of black that is desired.

A "dark colour pigment" will be understood as being one with a light reflectance value (L) of less than 50 when measured using a spectrophotometer (on a scale where 0 is black and 100 is white).

Manganese ferrite, usually known for its electromagnetic properties (it is used in magnets), has been found to produce a black colouration of some strength. Even using this material at higher loadings than carbon black in the PU compound the jetness is still relatively weak compared to carbon black pigmentation.

According to one embodiment of the method of the present invention a portion of manganese ferrite is used in combination with a 'top up' of carbon black pigment, i.e. possibly 70:30 but more typically a 80:20 ratio, even as low as 90:10 ratio by weight of manganese ferrite:carbon black. The amount of carbon black present is therefore substantially less than is used in conventional methods. But this is a compromise with carbon black still being present in the finished coating and so still creating an organic solvent (e.g. DMFa) anchoring foundation.

Surprisingly, it has been found that a combination of manganese ferrite and dark colour pigments, such as organic green based pigments, has a synergistic effect in increasing substantially the jet black property. This combination being particularly preferred, such that loadings of manganese ferrite in combination with an organic dark green gives rise to a very reasonable (and commercially acceptable) jet black glove coating.

The organic dark green pigment used in the method of the present invention is preferably a phthalocyanine. It will be understood that the green based pigments, and any other dark colour pigments, used in the method may be a mixture of more than one pigment. An example of such a dark green pigment is sold under the name WS38716A and which comprises both green pigment (Colour Index 7) and violet pigment (Colour Index 23) together with polyether polyol. Other dark colour pigments that may be used in the present invention include Perylene green/black, blue pigments, violet pigments and purple pigments. The manganese ferrite and the pigment may be premixed together in the desired proportions before use in the method, or be added as separate components in the desired proportions either simultaneously or sequentially during the performance of the method.

Similarly, in the embodiment of the method of this invention which involves the use of a reduced amount of carbon black, the manganese ferrite and the carbon black may be premixed together in the desired proportions before use in the method, or be added as separate components in the desired proportions either simultaneously or sequentially during the performance of the method. It will be understood that other pigments may be included.

Accordingly, the present invention enables PU coated fabrics and garments, such as gloves, to be produced by a method which either totally avoids the use of carbon black or substantially reduces the amount that is used. As such there is then no chemical and less physical attraction of pigment to the DMFa, or other organic solvents, in the coated glove that is produced. This means that PU gloves with black or grey coatings can now be produced with much lower DMFa residual content in them. Grey coloured compounds, usually being made by the combination of titanium dioxide white with a small amount of carbon black, can now be provided by using titanium dioxide white and the non-carbon black composition of the present invention. As noted above, due to the properties of the titanium oxide pigment used during their manufacture, white gloves can already be produced with significantly lower residual DMFa content.

DETAILED DESCRIPTION OF THE INVENTION

The present invention provides a method of manufacturing PU coated gloves, both black and grey in colour, wherein the typical 'active effect' of carbon black pigment in the dipping compound is replaced with preferred neutral effect metallic oxide types, or a particularly preferred combination of manganese ferrite with a dark colour pigment and, in particular, a combination of manganese ferrite with organic dark green pigments.

The PU compound being used in the method is a substantially diluted PU resin to around 10-15% solids with preferred DMFa and/or other typical polar aprotic solvents, such as dimethyl sulphoxide or methyl ethyl ketone.

Typical carbon black pigments have a very strong affinity for these preferred organic solvents, many of which are known to be hazardous and so are not desirable in the finished product, which in the case of gloves are in direct contact with the human skin. The use of non-active effect pigments in the present invention has the advantage that it results in a much lower residual solvent content of the gloves after processing. The final product is hence much safer for its intended use.

While the following account refers largely to the dip coating process, it will be well understood by persons skilled in the art that the method and compositions of the present invention may also be used in other procedures for applying polymers to fabrics, such as spraying, curtain or shower coating, and screen printing.

The process of making dip coated PU gloves is relatively simple. Such dipping processes can be performed on a simple manual basis or go on up to massive automated manufacturing plants. However, the basic process fundamentals remain the same.

Typically, aluminium hand shaped formers are used. These are usually PTFE coated to allow for easy loading of fabric liners and then stripping of the finished PU gloves where the PU tends to substantially penetrate the fabric glove liner and during drying and curing stick to the former. Hence the need for a PTFE coating on the former to aid product release.

There is a huge range of fabric liners used in the mass glove production plants. Most typical gloves are simple machine knit nylons or polyesters, the majority being made on 15 gauge (15 needles per inch) automated knitting machines such as Shima Seiki flat bed machines. There are also many cut resistant liners made: from fine, thin 18 gauge knitted, to thicker, heavier shells made on 10 gauge knitting machines. These heavier 10 gauge glove liners are impregnated with more compound and which leads to heavier gloves that can be even more problematic with regards to retaining DMFa. Those practised in the art will realise that knitted glove shells are not limited to this version of various glove knitting machines.

The vast majority of the glove production is made using 15 gauge knitted shells based typically but not limited to nylon 6, nylon 66 and polyester. These shells are sometimes a knitted blend with elastane type yarns such as Lycra™ or Spandex™ to increase elasticity of the shell to enhance grip and comfort. Many of the heavier, tougher gloves are made of more technical cut resistant yarns which comprise, for example, ultra high molecular weight polyethylene (UHM-WPE), such as Dyneema®, or Tsunooga®, or perhaps a meta-aramid, such as Nomex®, or a para-aramid, such as Kevlar®, or Twaron®. These may be plied in conjunction with wrapping yarns or also concurring steel yarns and or glass fibre yarns. All to increase cut resistance. The shells can also be of a plaited nature where one side of the knitted material is of one yarn type and the reverse side is another yarn type, or have targeted yarn specific knitting back to back faces of the shell fabric with different yarns.

As will be well understood by those skilled in the art, the liner may be made of other types of fabrics or materials to those listed above. For example, it may be woven and/or made up of multiple pieces sewn together.

Typically, the initial stage of the process is to load the fabric liner/shell onto the hand shaped former.

The dressed hand shaped formers are then dipped in the viscous liquid PU compound. The PU resin and DMFa solvent percentages are balanced to give a target viscosity that will both give adequate fabric penetration during the dip and yet at the same time not all of the compound will drain off the glove in the process.

A set time is given for draining after dipping, typically 4-9 minutes, but more preferably 5-7 minutes, in the fingers pointing down position to allow the excess of the flowing compound to drain off the former. This is usually until the intermittent compound drips are occurring at the finger tips. The hand formers are then rotated to the fingers up position to allow the mobile compound to flow back down and so even out the compound distribution on the palm of the glove.

The coated glove is then rotated back down through 180° and is slowly immersed in the first water coagulation tank/leach tank. Typically, this initial tank contains between 5 and 15% DMFa and more preferably between 8 and 12% DMFa. It is at this point that a gelling reaction of the PU dipped compound happens. As the water enters the DMFa PU compound through osmosis it penetrates the PU and rapidly extracts the polar aprotic DMFa. The extraction occurs relatively quickly and results in the fluid PU/DMFa resin becoming a gelled semi-solid as water replaces the organic solvents, i.e. organic PU resin does not dissolve in water. This rapid extraction of the majority of 'free' DMFa during gelation of the PU results in an excellent microporous coating which is a massive advantage for breathability and grip of the finished PU glove coating on which the PU glove market has based its success.

The PU dipped gloves then progress on through several separate water leaching tanks. Each time the glove formers leave a leach tank and move on to the next tank the percentage of DMFa in each leach tank gradually reduces from 10% in the initial tank down to typically no more than 1.0% (and more preferably near to 0%) in the last leach tank. This can also be performed in one long leach tank.

The leached gloved former leaves the last leach tank fingers down and drains for 5 minutes or so to allow the excess contaminated water to drain off. The formers then rotate around to the fingers up position and enter a drying oven where the temperatures are typically around 80-90° C. Over a period of an hour or so the temperatures are raised up to 100° C. to evaporate off most of the water and also evaporate off most of the DMFa, and cure the PU coating. At the exit of the oven the formers dressed with the finished dried cured gloves are allowed to cool slightly and then the PU coated glove is removed. A new knitted liner shell will then be placed on the former ready for the next dipping circuit.

FIG. 1 shows a brief schematic outline of the basics of the glove dipping process.

After the above 'on plant' process there can often be additional processing to remove further DMFa from the gloves, such as multiple tumble washing, tumble drying and re-heating.

The compounds used for solvent based PU gloves are typically mixed and dissolved with polar aprotic solvents such as DMFa, dimethyl sulphoxide, dimethyl pyrrolidone, dimethyl acetamide, or methyl ethyl ketone. Particularly preferred is DMFa. A typical formulation will consist of PU resin, or resins that can be of various crosslinkable hardnesses. Often blends of resins are involved to get the right feel and performance of a glove. Those who are practised in the art will be aware of this fact. The resins are usually purchased predissolved in DMFa and come in at around 30% solids solutions. TG-1020 for instance. An example of a supplier is Heung-il Polychem Ltd, Song Jung-Dong, Kang Seo-Gu, Busan, South Korea. Also SW-2030, as supplied by Duksung Co Ltd.

The pigment is also usually predissolved in a ratio of PU resin and DMFa. A supplier of the carbon black pigment is Ilsam Co Ltd, Myongji Bldg, 135, Seosomoon-Dong, Jung-Gu, Seoul, Korea.

The formulations may also include processing aids of polysiloxane, such as HD 7. A supplier is Heung it Polychem Ltd.

A further typical component is a polyol addition, such as DS 600. A supplier being Duksung Co Ltd, Shin-Dong, Yeongtong, Suwon-Si, Kyungi-Do, Korea.

Those practised in the art will be aware of the materials and suppliers.

The present invention will now be illustrated by the following examples. Unless otherwise indicated, either in the preceding or following text, all parts are by weight.

Example 1

A typical carbon black standard pigment 25% solution/dispersion is as follows:—

|  | Parts |
|---|---|
| 1. Carbon black dry powder | 25 |
| 2. Polyurethane elastomer | 25 |
| 3. DMFa | 50 |

This is usually milled to make sure there is a fine dispersion/solution of the pigment particles.

Example 2

A preferred 30% pigment solution made with just manganese ferrite is as follows:—

|  | Parts |
|---|---|
| 1. Manganese ferrite | 10 |
| 2. 35% TG 1020 | 29 |
| 3. 100% DS 600 | 0.001 |
| 4. DMFa | 60 |

This needs to be milled to create a fine particle solution. The manganese ferrite was supplied by Ferro Corporation of Kunlun Town, Zichuan District, Zibo, Shandong Province 255129, China.

Example 3

A pigment solution/dispersion made with manganese ferrite and a green pigment is as follows:—

|  | Parts |
|---|---|
| 1. 100% Manganese ferrite | 10 |
| 2. 35% TG 1020 | 29 |
| 3. 100% DS 600 | 0.001 |
| 4. 30% green WS38716A | 0.15 |
| 5. DMFa | 60 |

An example of a suitable green pigment dispersion is WS38716A as supplied by West and Senior Ltd, Milltown Street, Radcliffe, Manchester, England. This is a 30% solids dispersion in polyol.

Example 4

A typical glove dipping formulation that the pigments of Examples 1, 2 and 3 may be used with is as follows:—

|  | Parts (per hundred of polymer) |
|---|---|
| 1. 30% TG1020 Resin | 200.000 |
| 2. 25% SW-2030 | 160.000 |
| 3. 100% HD7 | 3.047 |
| 4. 100% DS 600 | 6.100 |
| 5. 25% Pigment | 46.000 |
| 6. 100% DMFa | 405.800 |

Typically the solvent DMFa is adjusted up or down to maintain a suitable dipping viscosity of possibly 700-1400 and more preferably 900-1100 centipoise. Those practised in the art will be familiar with this practice.

This dipping formulation was then used to produce gloves according to the process shown in FIG. 1, but with an additional washing and re-drying procedure. The knitted shell for the gloves was a 15 gauge nylon. The washing procedure was a 30 minute fresh water wash at 45° C., followed by a 5 minute rinse at room temperature and a centrifugal spin to remove excess water. The gloves were tumble dried for 90 minutes at 55° C. The gloves were tested (as described below) seven days after their manufacture.

Results

The use of the carbon black pigment dispersion of Example 1 in the formulation of Example 4 produces suitably commercial black coloured PU dipped gloves. However, there is the major problem of the residual DMFa in the gloves produced.

When the pigment dispersion of Example 2 is used in the formulation of Example 4, the jet blackness simply is not present in the gloves produced (as demonstrated in the shade depth analysis data below).

The black shade strength can be increased by using a combination of the pigment dispersion of Example 2 (manganese ferrite alone) and the pigment dispersion of Example 1 (carbon black), at a ratio of 80:20, which will yield gloves having a reasonable jet blackness (as shown in the shade depth analysis data below). However, the gloves have the disadvantage of a relatively high residual DMFa content.

When the pigment dispersion of Example 3 is used in the formulation of Example 4, however, it is surprisingly found that a considerably increased black jet tone is produced compared with the use of the pigment containing manganese ferrite alone of Example 2 (as shown in the shade depth analysis data below). A very commercially acceptable black shade is achieved.

Shade Depth Analysis

The tests were carried out on a Datacolor 110 spectrophotometer. The test method involved firstly scanning a standard production black dipped glove palm that had 12% of Example 1 pigment. The scanning was performed five times on each glove sample palm and the average recorded on the software. The first test was on a standard production glove made with carbon black and used as the reference as 100% black colour strength. Then each of the laboratory produced sample pigment combinations were tested against the reference.

% Colour Strength Against the Standard Production

| | | |
|---|---|---|
| 1. 11.5% Standard carbon black | | 95.67% |
| 2. 11.5% Manganese ferrite | | 68.35% |
| 3. 11.5% Manganese ferrite + 3% carbon black | | 88.53% |
| 4. 11.5% Manganese ferrite + 0.15% WS38617A | | 77.80% |

By comparison, a sample of WS38617A alone gave approximately 35% black colour strength. These results clearly demonstrate the synergy between the manganese ferrite and the green based pigment (WS38617A). When they are used in combination a significantly darker black colouration is produced compared to when either of them is used alone.

Residual DMFa Analysis

The black PU gloves produced using i) the standard carbon black pigment and ii) the combination of manganese ferrite with WS38716A pigment have been analysed for residual DMFa content at Intertek Consumer Goods Gmbh, of Furth, Germany. The method used to extract the DMFa from the gloves is extensive and probably the most accurate measurement of DMFa content of a product. The extraction involves soaking a set amount (1 gram) of the glove material in a set amount (10 ml) of methanol, heating to 70° C. for an hour in an ultrasonic bath, then using GC/MS to establish the residual DMFa in the glove material. The results below of the comparison test are expressed in milligrams per kilogram, or parts per million (ppm). Essentially this is the same extraction method as specified in EN ISO 16778, but yet with a longer dwell time of material in the methanol extraction media of 60 minutes (compared to EN 16778 at 30 minutes).

Using Carbon Black Standard Dispersion (Example 1):—
TEST REPORT FUTXP2014-16857 Residual DMFa is 240 mg/kg (ppm)
Using Manganese Ferrite and WS38716A (Example 3):—
TEST REPORT FUTXP2015-03272 Residual DMFa is 6.9 mg/kg (ppm)

The results show that the PU coated gloves produced using a pigment that contains both manganese ferrite and a phthalocyanine green based pigment (such as WS38716A) have an acceptably dark black colouration and a very low residual DMFa content in comparison to PU coated gloves produced using a standard carbon black pigment.

The invention claimed is:

1. A method of making a pigmented polyurethane coated glove comprising:
 a) providing a fabric glove liner;
 b) applying, to at least part of the liner, a coating of a solution comprising a polyurethane resin dissolved in a polar aprotic solvent, said coating solution also containing a black pigment and a phthalocyanine;
 c) at least partially gelling the coating with water or an aqueous solution so that the polar aprotic solvent is extracted from the coating;
 d) leaching the at least partially gelled coating with water or an aqueous solution so as to further reduce the level of the polar aprotic solvent in the coating; and
 e) drying and curing the coating;
 wherein the black pigment is comprised of manganese ferrite and the polar aprotic solvent is comprised of N,N-dimethylformamide, such that the pigmented polyurethane-coated glove contains a reduced amount of residual N,N-dimethylformamide compared with a pigmented polyurethane-coated glove made with the use of N,N-dimethylformamide as the polar aprotic solvent and a black pigment comprising carbon black.

2. The method as claimed in claim 1, wherein the manganese ferrite is present in an amount of from 5-15% by weight.

3. The method as claimed in claim 1, wherein the proportion of the manganese ferrite to the phthalocyanine is from 10:0.001 to 10:1.0 by dry weight.

4. The method as claimed in claim 1, wherein the coating also contains carbon black and the proportion of manganese ferrite to carbon black is from 70:30 to 90:1 by weight.

5. The method as claimed in claim 1, wherein the coating is applied to the liner by dip coating, curtain coating, shower coating, spray coating and/or screen printing.

6. The method as claimed in claim 1, further comprising one or more washing and drying steps.

* * * * *